(12) United States Patent
Ogata et al.

(10) Patent No.: US 7,992,373 B2
(45) Date of Patent: Aug. 9, 2011

(54) LAWN MOWER WITH GRASS COLLECTING UNIT SUPPORT

(75) Inventors: Satoshi Ogata, Sakai (JP); Yoshio Tomiyama, Osaka (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 12/372,928

(22) Filed: Feb. 18, 2009

(65) Prior Publication Data
US 2009/0282797 A1 Nov. 19, 2009

(30) Foreign Application Priority Data

May 14, 2008 (JP) ................................. 2008-127548

(51) Int. Cl.
*A01D 43/00* (2006.01)
*A01D 43/06* (2006.01)
(52) U.S. Cl. ........................................ 56/202; 56/320.2
(58) Field of Classification Search .................... 56/202, 56/320.2, 194; 15/79.2
See application file for complete search history.

(56) References Cited

U.S. PATENT DOCUMENTS

| | | | | |
|---|---|---|---|---|
| 3,744,653 A * | 7/1973 | Jensen | ........................... | 414/471 |
| 4,476,668 A * | 10/1984 | Reilly | ............................. | 56/202 |
| 4,523,788 A * | 6/1985 | Prasad | ........................... | 298/11 |
| 4,709,541 A * | 12/1987 | Broman et al. | ................. | 56/202 |
| 4,796,322 A * | 1/1989 | Steed et al. | .................... | 15/79.2 |
| 5,180,126 A * | 1/1993 | Bennett | ........................... | 248/99 |
| 6,050,072 A * | 4/2000 | Chabrier et al. | ................ | 56/202 |
| 6,076,782 A * | 6/2000 | Alderman | ........................ | 248/97 |
| 6,449,933 B1 * | 9/2002 | Umemoto et al. | ............. | 56/13.3 |
| 6,513,312 B1 * | 2/2003 | Ishimori et al. | ................. | 56/203 |
| 6,584,757 B2 * | 7/2003 | Komorida et al. | ............. | 56/202 |
| 7,219,489 B2 * | 5/2007 | Tada et al. | ........................ | 56/202 |
| 7,565,790 B2 * | 7/2009 | Uemura et al. | ................. | 56/194 |
| 7,617,663 B1 * | 11/2009 | Walton et al. | ................... | 56/202 |
| 7,730,706 B2 * | 6/2010 | Ogata et al. | ..................... | 56/203 |
| 7,731,134 B1 * | 6/2010 | Mutert | ............................ | 248/99 |
| 2006/0042214 A1 * | 3/2006 | Asahara et al. | ................ | 56/202 |

FOREIGN PATENT DOCUMENTS

JP 2002101722 A * 4/2002
JP 2002238322 8/2002

\* cited by examiner

*Primary Examiner* — Arpád Fábián-Kovács
(74) *Attorney, Agent, or Firm* — The Webb Law Firm

(57) ABSTRACT

A connecting mechanism (60) is provided for detachably connecting A grass collecting unit (30) to a chassis (4), and the connecting mechanism (60) includes a connecting unit (40) at the grass collecting unit side provided in a support frame assembly (31), and a connecting unit (50) at the vehicle body side provided in the chassis (4). The support frame assembly is vertically movable by the driving unit with the grass container (32) being supported to the ground through a support (70), which selectively achieves a connecting operation performed by the connecting mechanism (60) for connecting the connecting unit (40) at the grass collecting unit side to the connecting unit (50) at the vehicle body side, and a releasing operation performed by the connecting mechanism (60) for releasing connection between the connecting unit (40) at the grass collecting unit side and the connecting unit (50) at the vehicle body side.

10 Claims, 7 Drawing Sheets

LAWN MOWER WITH GRASS COLLECTING UNIT SUPPORT

BACKGROUND OF THE INVENTION

1. Field of the Invention

The present invention relates to a lawn mower with a grass collecting unit.

2. Description of the Related Art

One example of lawn mowers with a grass connecting unit is known from Japanese Unexamined Patent Application No. 2002-238322 (see paragraph 0016; FIGS. 1, 3 and 4), in which the lawn mower comprises a support frame connected at a rear portion of a vehicle body, a grass container supported to the support frame through an upper link, a lower link, and a vertical link, and a hydraulic cylinder mounted between the upper link and the lower link of the support frame. The lower link is vertically pivotable relative to the support frame by action of the hydraulic cylinder, thereby allowing the grass container to be vertically movable relative to the support frame. In this type of lawn mower, the support frame has conventionally been fixedly connected to a chassis of the lawn mower through connecting bolts.

The lawn mower performs not only a mowing operation for collecting grass clippings in the grass container but also a mowing operation for discharging and leaving the grass clippings on the ground such as a mulching operation. Since the latter case does not require the grass container, the grass collecting unit including the grass container should be removed from the lawn mower. In order to detach the grass collecting unit from the lawn mower, the numerous connecting bolts should be removed with the grass collecting unit being suspended by a crane or a lifter to release connection of the grass collecting unit relative to the lawn mower, then the grass collecting unit should be lowered on the ground. Also, in order to attach the grass collecting unit to the lawn mower, a reversed process should be performed. Such operations for attaching and detaching the grass collecting unit to/from the lawn mower place a heavy burden on the operator.

SUMMARY OF THE INVENTION

The object of the present invention is to provide a lawn mower having an arrangement facilitating operations for attaching and detaching the grass collecting unit to/from the lawn mower.

In order to achieve the above-noted object, the grass collecting unit of the lawn mower in accordance with the present invention comprises a support frame assembly connected to a rear portion of the chassis, a grass container supported by the support frame assembly to be vertically movable, a driving unit for vertically moving the grass container relative to the support frame assembly, and a connecting mechanism for detachably connecting the grass collecting unit to the chassis. The connecting mechanism includes a connecting unit at the grass collecting unit side provided in the support frame assembly, and a connecting unit at the vehicle body side provided in the chassis. Further, the support frame assembly is vertically movable by the driving unit with the grass container being supported to the ground through a support, which selectively achieves a connecting operation performed by the connecting mechanism for connecting the connecting unit at the grass collecting unit side to the connecting unit at the vehicle body side, and a releasing operation performed by the connecting mechanism for releasing connection between the connecting unit at the grass collecting unit side and the connecting unit at the vehicle body side.

With this arrangement, the support frame assembly is moved relative to the grass container when the driving unit is actuated with the grass container being supported to the ground through the support. In this, the connecting unit at the grass collecting unit side is movable to disengage from the connecting unit at the vehicle body, thereby releasing connection by the connecting mechanism between the connecting unit at the grass collecting unit side and the connecting unit at the vehicle body side. As a result, the support frame assembly is removed from the chassis. Also, the connecting unit at the grass collecting unit side is movable closer to the connecting unit at the vehicle body side, which allows the connecting mechanism to connect the connecting unit at the grass collecting unit side to the connecting unit at the vehicle body side. As a result, the support frame assembly is connected to the chassis. Thus, the grass collecting unit is attached to or detached from the lawn mower without using special equipment such as a crane required in the conventional mower and without taking time and effort required in the conventional mower. Consequently, the lawn mower is easily switchable between a mode in which a mowing operation is performed for collecting grass clippings in the grass container and a mode in which a light mowing operation is performed without using the grass collecting unit.

According to one example of the preferred embodiments of the present invention, the support is attached to the grass container to change its position and selectively switchable between a use position in which the support contacts the ground at one end thereof to support the grass container and a stored position in which the entire support is pulled up to the grass container to be supportingly received by the grass container. More particularly, it is advantageous to provide the support formed as a stand unit for changing its position. The support, that is, the stand unit is lowered to switch to the use position, thereby allowing the grass collecting unit to be supported to the ground. In that state, the grass collecting unit is attached to or detached from the lawn mower. The stand unit is raised to switch to the stored position, which would not hamper the lawn mower from traveling.

According to another example of the preferred embodiments of the present invention, the connecting mechanism is adapted to connect the grass collecting unit to the chassis by a connecting function achieved by a fixing connecting pin in the connecting unit at the grass collecting unit side that is received in a pin receiving opening in the connecting unit at the vehicle body side, and a connecting function achieved by an attachment connecting pin that is inserted into a pin hole in the connecting unit at the grass collecting unit side and a pin receiving opening in the connecting unit at the vehicle body side. With this arrangement, the grass collecting unit is connected to the chassis by a simple operation for inserting the pin to the pin hole or pin receiving opening.

A process for performing attachment and detachment between the grass collecting unit and the chassis would become further smooth and reliable if a guide element is provided for aligning the pin hole in the connecting unit at the grass collecting unit side with the pin receiving opening in the connecting unit at the vehicle body side, or if the fixing connecting pin in the connecting unit at the grass collecting unit side and the pin receiving opening in the connecting unit at the vehicle body side cooperatively achieve a guiding function in a process for attachment and detachment between the grass collecting unit and the chassis.

Further characteristic features and advantages of the present invention will be apparent from the following description of the embodiments in reference to the accompanying drawings.

DETAILED DESCRIPTION OF THE PREFERRED EMBODIMENTS

An embodiment of a lawn mower in accordance with the present invention will be described hereinafter in reference to the drawings.

Figure 1:
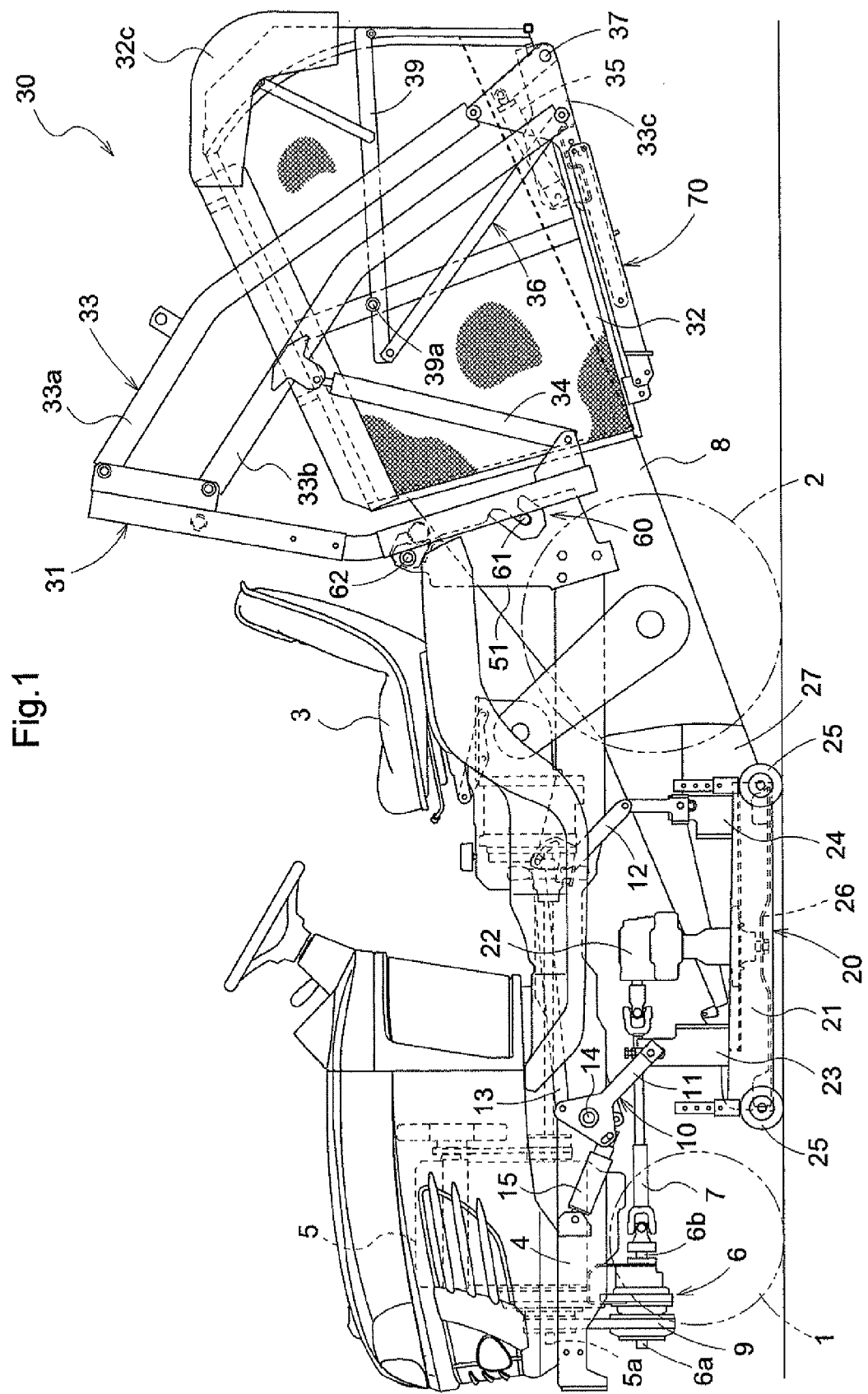
FIG. 1 is a side elevation of a lawn mower.

FIG. 1 is a side elevation of a self-propelled lawn mower. The lawn mower comprises a pair of right and left steerable front wheels 1, a pair of right and left driven rear wheels 2, and a chassis 4. This lawn mower is a ride-on type and further comprises a driver's section including a driver's seat 3 mounted rearwardly of the chassis 4. A mower unit 20 is suspended from the chassis 4 between the front and rear wheels through a link mechanism 10. A grass collecting unit 30 is mounted rearwardly of the chassis 4, including a grass container 32 supported through a support frame assembly 31. An engine 5 is mounted forwardly of the chassis 4, and a power takeoff mechanism 6 is arranged under the engine 5.

The lawn mower travels while driving the mower unit 20 to perform a mowing operation for cutting grass.

The power takeoff mechanism 6 transmits output from an output shaft 5a of the engine 5 oriented to a forward direction of a vehicle body to an input shaft 6a through a transmission belt 9, and also transmits a driving force from the input shaft 6a to a blade driving unit 22 arranged above a blade housing 21 of the mower unit 20 through a rotary transmission shaft 7 from the output shaft 6b.

The link mechanism 10 includes a pair of right and left front pivotable links 11 supported to the chassis 4 to be vertically pivotable, a pair of right and left rear pivotable links 12 supported to the chassis 4 to be vertically pivotable, and a pair of right and left interlocking links 13. The pair of right and left front pivotable links 11 are connected at distal ends thereof to a front connecting member 23 positioned forwardly of the blade housing 21 of the mower unit 20. The pair of right and left rear pivotable links 12 are connected at distal ends thereof to a rear connecting member 24 positioned rearwardly of the blade housing 21. The left interlocking link 13 is adapted to interlock the left front pivotable link 11 with the left rear pivotable link 12 while the right interlocking link 13 is adapted to interlock the right front pivotable link 11 and the right rear pivotable link 12. The pair of right and left front pivotable links 11 are interlocked with each other through a single rotary support shaft 14. A lift cylinder 15 is interlocked with the left front pivotable link 11. More particularly, the link mechanism 10 is vertically pivoted relative to the chassis 4 as the front pivotable link 11 is pivoted by the lift cylinder 15, thereby selectively producing a lowered operative mode in which ground gauge rollers 25 supported forwardly and rearwardly of the blade housing 21 of the mower unit 20 contact the ground, and a raised inoperative mode in which the ground gauge rollers 25 are raised from the ground.

When the lawn mower travels with the mower unit 20 being in the lowered operative mode, cutting blades 26 arranged transversely in the interior of the blade housing 21 are rotatably driven about a vertical axis by the blade driving unit 22. In this manner, a mowing operation is performed by action of each cutting blade 26, and grass clippings are discharged through a grass discharge duct 27 positioned above the blade housing 21 by blown air generated by rotation of the cutting blades 26.

The grass clippings discharged from the grass discharge duct 27 are directed to the grass container 32 by transporting action of blown air from the cutting blades 26 and guiding action of a transport duct 8 mounted on the lawn mower and extending between the pair of right and left rear wheels 2 in a fore-and-aft direction of the vehicle body, and then collected and accumulated in the grass container 32.

Figure 2:
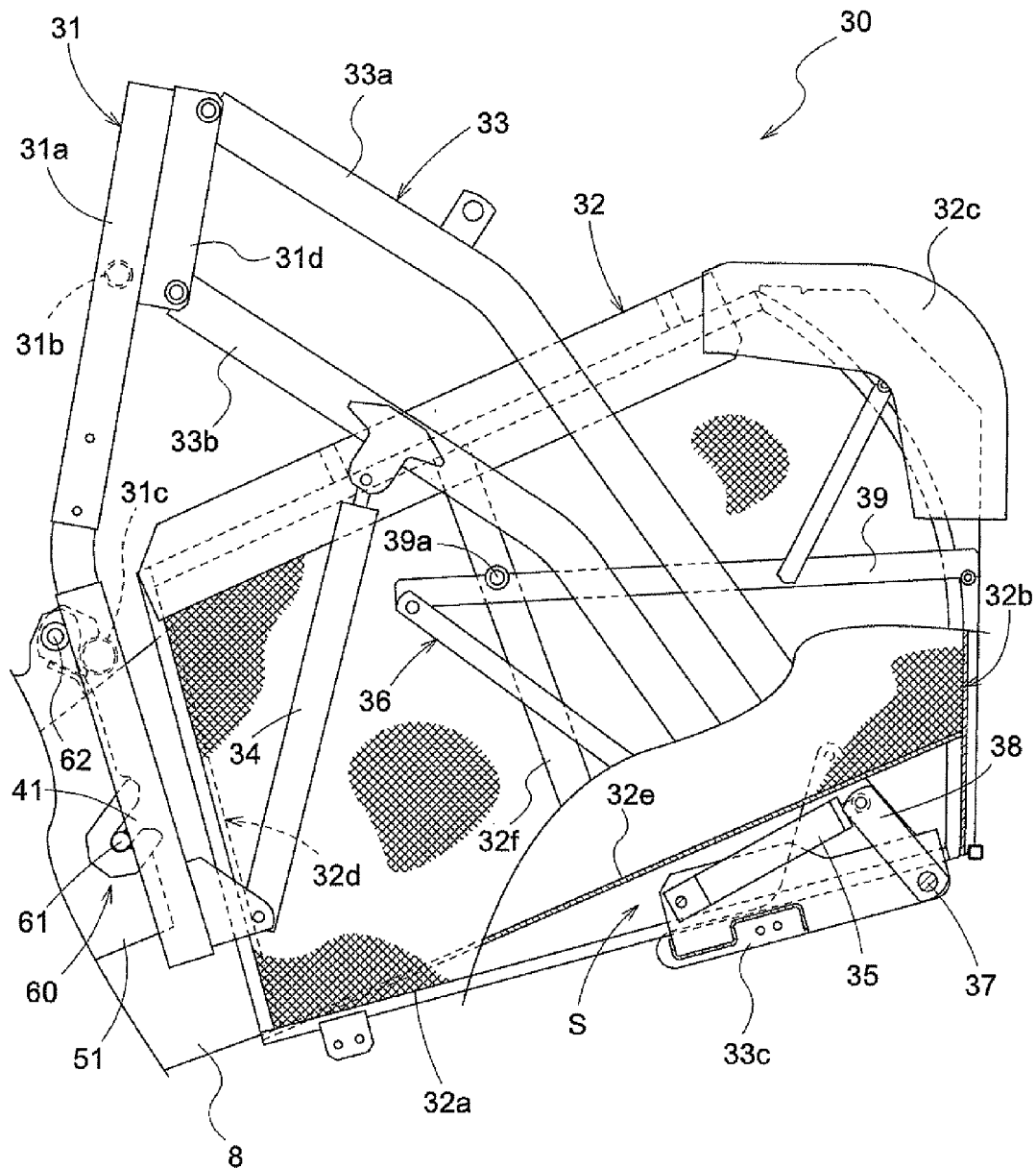
FIG. 2 is a side view of a grass collecting unit in a grass collecting state.

FIG. 2 is a side view of the grass collecting unit 30. As shown in FIGS. 1 and 2, the grass collecting unit 30 includes the support frame assembly 31 and the grass container 32, and further a link mechanism 33 for connecting an upper end portion of the support frame assembly 31 to a lower end portion of the grass container 32 at a rear end side thereof, lift cylinders 34 including hydraulic cylinders mounted at opposite lateral sides of the grass container 32, a single dump cylinder 35 including a hydraulic cylinder mounted under the grass container 32 at the rear end side thereof, and outlet opening and closing links 36 mounted at the opposite lateral sides of the grass container 32.

The support frame assembly 31 includes a pair of right and left main frames 31a extending vertically of the vehicle body, an upper connecting frame 31b extending transversely of the vehicle body to connect the pair of right and left main frames 31a with each other at upper ends thereof, and an intermediate connecting frame 31c extending transversely of the vehicle body to connect the pair of right and left main frames 31a with each other at intermediate portions thereof.

The link mechanism 33 includes a vertical pair of lift links 33a and 33b extending rearwardly from a support 31d disposed at an upper end portion of the left main frame 31a of the support frame assembly 31 to be vertically pivotable, a vertical pair of lift links 33a and 33b extending rearwardly from a support 31d disposed at an upper end portion of the right main frame 31a of the support frame assembly 31 to be vertically pivotable, and container supporting members 33c connected to the left vertical pair of lift links 33a and 33b at extensions thereof and to the right vertical pair of lift links 33a and 33b at extensions thereof, respectively. Each pair of the lift links 33a and 33b are connected to each container supporting member 33c to be relatively rotatable. More particularly, the grass container 32 is supported to the support frame assembly 31 to be vertically movable.

The left lift cylinder 34 is connected between the left lift link 33b and a lower portion of the left main frame 31a of the support frame assembly 31 while the right lift cylinder 34 is connected between the right lift link 33b and a lower portion of the right main frame 31a of the support frame assembly 31. More particularly, the pair of right and left lift cylinders 34 allow the link mechanism 33 to be vertically pivotable relative to the support frame assembly 31, thereby operating the grass container 32 to be movable between a lowered grass collecting position (see FIG. 1) in which the grass container is lowered to a rear position at a rear end portion of the transport duct 8 and a raised grass discharge position (see FIG. 3) in which the grass container is raised to an upper rear position at the rear end portion of the transport duct 8.

Figure 3:
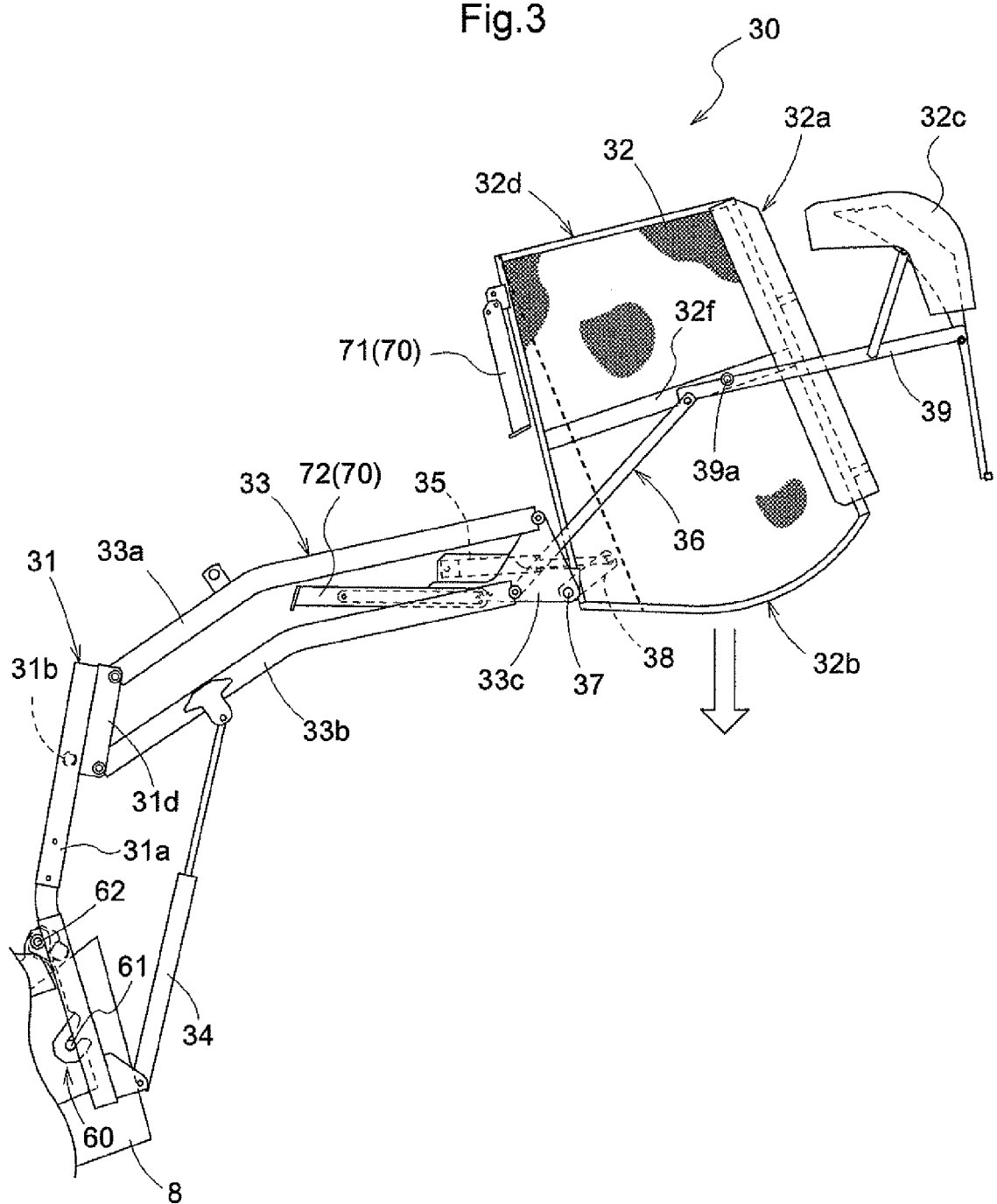
FIG. 3 is a side view of the grass collecting unit in a grass discharging state.

The grass container 32 is provided with a container body 32a supported to the container supporting members 33c through a rotary support shaft 37, and a discharge opening lid 32c for opening and closing a grass discharge opening 32b positioned at a rear end side of the container body 32a. The grass container 32 is pivotable about the rotary support shaft 37, i.e., vertically swung relative to the container supporting members 33c, thereby shifting from the lowered grass collecting position as shown in FIG. 3 to the raised grass discharge position as shown in FIGS. 1 and 2. In the raised grass discharge position, the grass discharge opening 32b is directed downward while a grass collecting opening 32d positioned at a forward end side of the container body 32a is directed upward. In the lowered grass collecting position, the grass collecting opening 32d is directed forwardly of the vehicle body while the grass discharge opening 32b is directed rearwardly of the vehicle body.

The dump cylinder 35 is connected between a dump arm 38 which is rotatable with the rotary support shaft 37 in unison and the container supporting member 33c under the grass container 32 at an intermediate portion with respect to a width direction of the grass container 32. The dump arm 38 is pivoted about the rotary support shaft 37 to rotate the rotary support shaft 37 thereby switching the grass container 32 between the raised grass discharge position and the lowered grass collecting position. As the grass container 32 is switched to the lowered grass collecting position, the dump cylinder 35 and the dump arm 38 are stored in an accommodating space S (see FIG. 2) produced in a lower side of the grass container 32 by forming a bent portion in a bottom plate 32e of the container body 32a.

The left outlet opening and closing link 36 is connected between a connecting arm 39 for connecting the left side of the discharge opening lid 32c to a frame member 32f of the container body 32a to pivotably open and close the container body, and a left end portion of the container supporting member 33c. The right outlet opening and closing link 36 is connected between a connecting arm 39 for connecting the right side of the discharge opening lid 32c to the frame member 32f of the container body 32a to pivotably open and close the container body, and a right end portion of the container supporting member 33c. More particularly, the pair of right and left outlet opening and closing links 36 allow the connecting arms 39 to be pivoted about an axis of a connecting shaft 39a to an opening side and a closing side through pivotal movement of the container supporting member 33c relative to the container body 32a. The discharge opening lid 32c is switched to a closed state as the grass container 32 is switched to the lower grass collecting position, while being switched to an opened state as the grass container 32 is switched to the raised grass discharge position.

FIG. 3 is a side view of the grass collecting unit 30 in a grass discharge state. As shown in the drawing, when the pair of right and left lift cylinders 34 are extended, the link mechanism 33 is pivotably lifted through the pair of right and left lift cylinders 34, which allows the grass container 32 to be lifted to the raised grass discharge position. When the dump cylinder 35 is extended, the dump arm 38 is pivoted rearwardly by the dump cylinder 35, which allows the grass container 32 to be lifted to the raised grass discharge position. In this time, the connecting arms 39 are pivoted toward the opening side by the pair of right and left outlet opening and closing links 36 thereby switching the discharge opening lid 32c to the opened state, which allows the discharge opening 32b to be in the opened state. As a result, the grass clippings accumulated in the grass container 32 are discharged from the grass discharge opening 32b.

FIG. 2 is a side view of the grass collecting unit 30 in a grass collecting state. As shown in FIGS. 1 and 2, when the dump cylinder 35 is contracted, the dump arm 38 is pivoted forward by the dump cylinder 35, which allows the grass container 32 to be pivotably lowered to the lowered grass collecting position. In this time, the connecting arms 39 are pivoted toward the closing side by the pair of right and left outlet opening and closing links 36 thereby switching the grass discharge opening lid 32c to the closed state, which allows the grass discharge opening 32b to be in the closed state. When the pair of right and left lift cylinders 34 are contracted, the link mechanism 33 is pivotably lowered by the pair of right and left lift cylinders 34, which allows the grass container 32 to be pivotably lowered to the lowered grass collecting position. As a result, the grass collecting opening 32d of the grass container 32 agrees with the rear end portion of the transport duct 8 to communicate with the transport duct 8. Then, the grass clippings transported from the grass discharge duct 27 of the mower unit 20 through the transport duct 8 are received from the grass collecting opening 32d and collected in the grass container 32.

Figure 4:
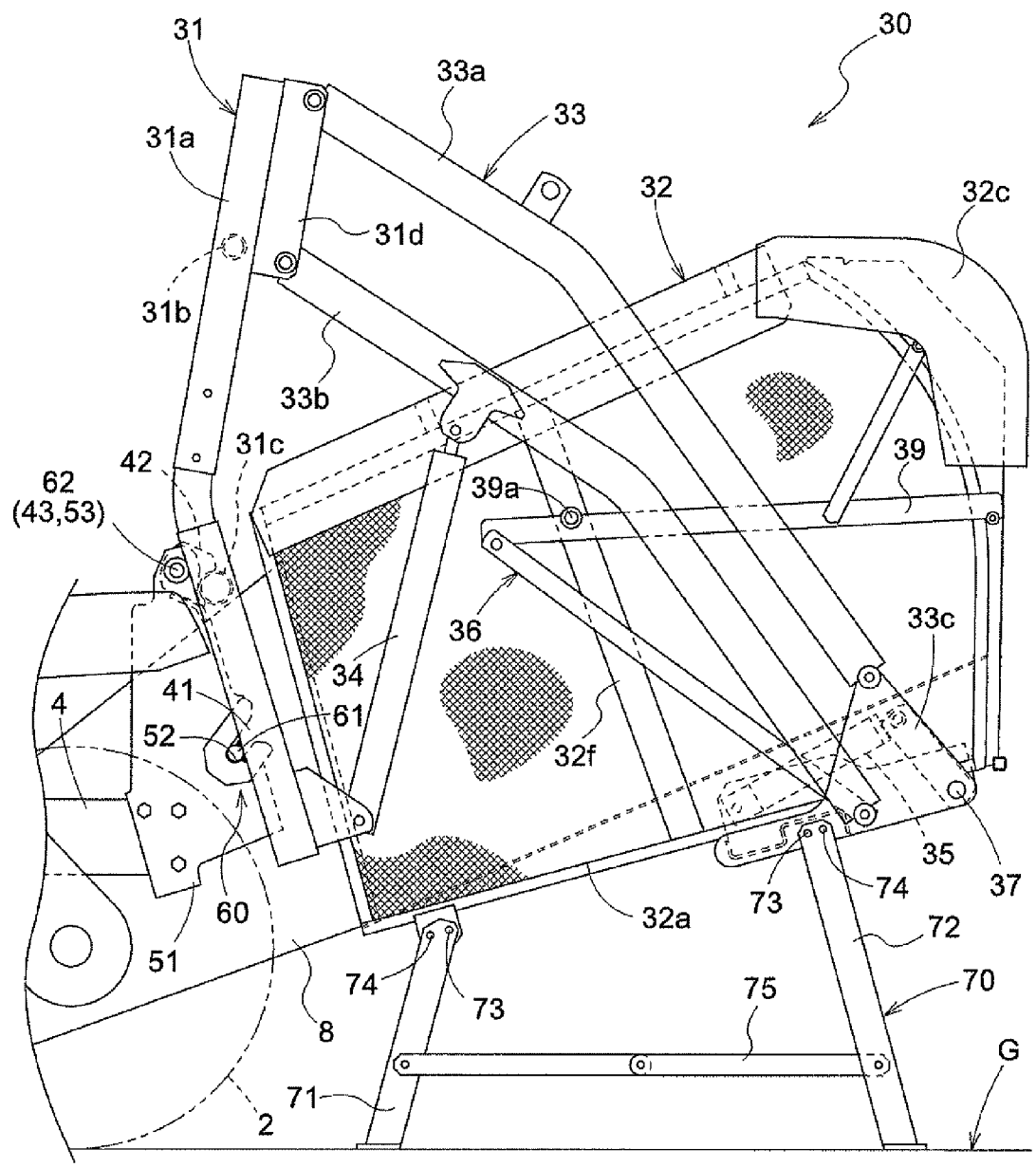
FIG. 4 is a side view of the grass collecting unit showing how it is attached to or detached from a vehicle body.
Figure 7:
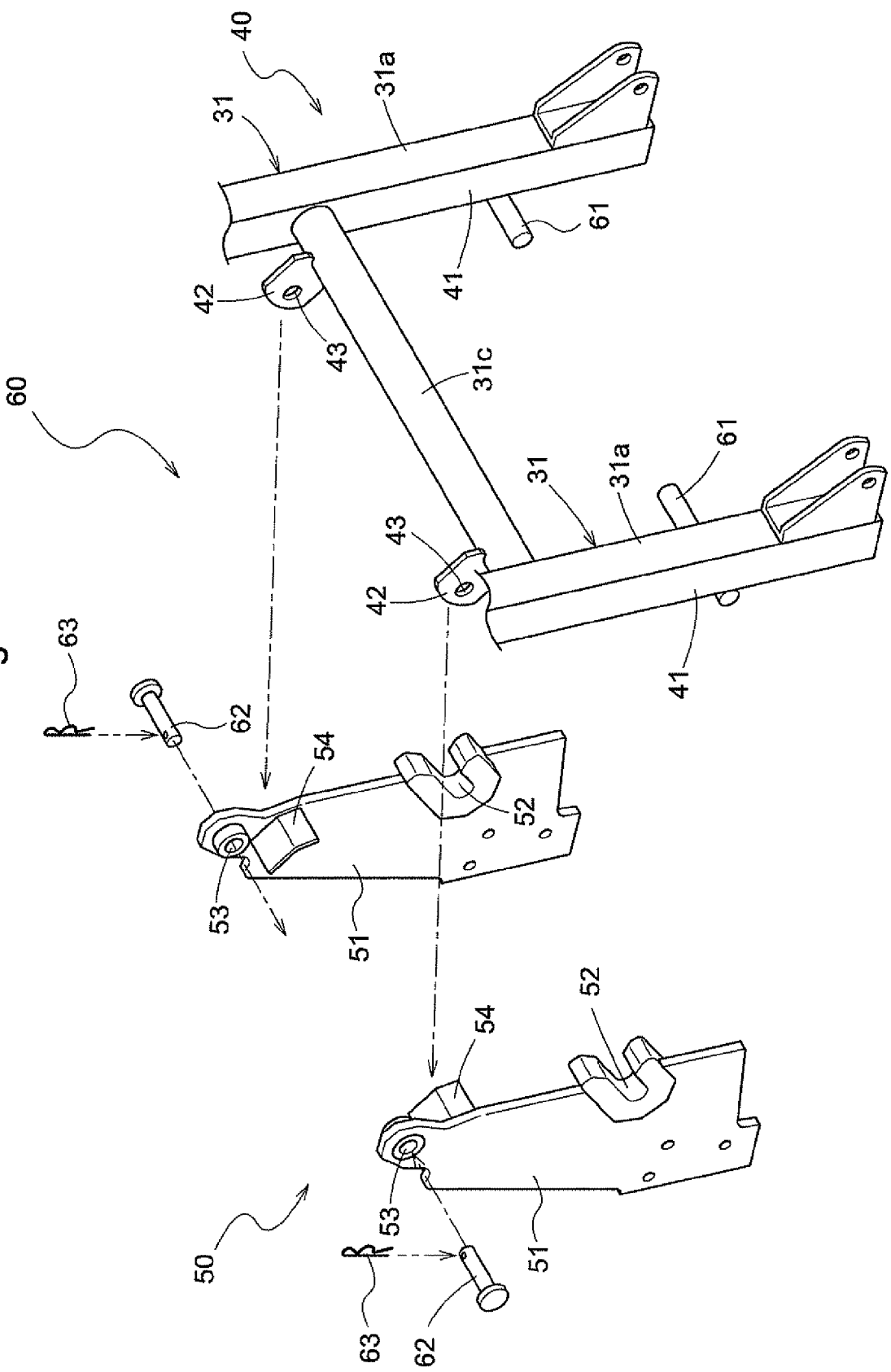
FIG. 7 is a perspective view of a connecting mechanism between a connecting unit at the grass collecting unit side and a connecting unit at the vehicle body side.

As shown in FIGS. 2, 4 and 7, a connecting mechanism 60 for connecting the grass collecting unit 30 to the chassis 4 includes a connecting unit 40 at the grass collecting unit side having lower connecting members 41 forming lower portions of the pair of right and left main frames 31a of the support frame assembly 31 and a pair of right and left upper connecting members 42 mounted on the intermediate connecting frame 31c of the support frame assembly 31, and a connecting unit 50 at the vehicle body side having a pair of right and left support members 51 mounted rearwardly of the chassis of the lawn mower. The connecting mechanism 60 further includes fixing connecting pins 61 extending transversely of the vehicle body and secured to the pair of right and left lower connecting members 41, lower pin receiving openings 52 provided in the support members 51, pin holes 43 formed in the upper connecting members 42, upper pin receiving openings 53 formed in upper end portions of the support members 51, and attachment connecting pins 62. Further, a stand unit 70 is provided in the bottom side of the grass container 32 to act as a support. The connecting mechanism 60 is adapted to connect the grass collecting unit 30 to the chassis 4 owing to a connecting function achieved by the fixing connecting pins 61 in the connecting unit 40 at the grass collecting unit side that are received in the pin receiving openings 52 in the connecting unit 50 at the vehicle body side, and a connecting function achieved by the attachment connecting pins inserted into both the pin holes 43 in the connecting unit 40 at the grass collecting unit side and the pin receiving openings 53 in the connecting unit 50 at the vehicle body side. As described later, such an arrangement of the grass collecting unit, in cooperation with the stand unit 70, facilitates attachment and detachment of the grass connecting unit 30 to/from the lawn mower.

As shown in FIG. 7, the connecting mechanism 60 forms a pin connection mechanism including the pair of right and left fixing connecting pins 61, the left attachment connecting pin 62 attachable to and detachable from the left upper connecting member 42 and the left support member 51, and the right attachment connecting pin 62 attachable to and detachable from the right upper connecting member 42 and the right support member 51. This pin connection mechanism detachably connects the connecting unit 40 at the grass collecting unit side to the connecting unit 50 at the vehicle body side.

More particularly, as shown in FIG. 4, the connecting mechanism 60 allows the connecting unit 40 at the grass collecting unit side to be connected to the connecting unit 50 at the vehicle body side when the left fixing connecting pin 61 is engaged with the lower pin receiving opening 52 provided in the lower portion of the left support member 51 while the right fixing connecting pin 61 is engaged with the lower pin receiving opening 52 provided in the lower portion of the right support member 51, and when the upper pin receiving opening 53 formed in the upper end portion of the left support member 51 is aligned with the pin hole 43 formed in the left upper connecting member 42 while the upper pin receiving opening 53 formed in the upper end portion of the right support member 51 is aligned with the pin hole 43 formed in the right upper connecting member 42. To be more specific, the pair of right and left attachment connecting pins 62 are attached thereby establishing connection between the connecting unit 40 at the grass collecting unit side and the connecting unit 50 at the vehicle body side.

Each lower pin receiving opening 52 provided in the pair of right and left support members 51 is a cut-away type that opens rearward and upward with respect to the vehicle body. The upper pin receiving openings 53 formed in the pair of right and left support members 51 and the pin holes 43 formed in the pair of right and left upper connecting members 42 are through bores arranged transversely of the vehicle body.

The right and left fixing connecting pins 61 are engaged with the lower pin receiving openings 52 provided in the support members 51, the attachment connecting pin 62 is attached to the left support member 51 and the left upper connecting member 42, and the attachment connecting pin 62 is attached to the right support member 51 and the right upper connecting member 42, thereby connecting the connecting unit 40 at the grass collecting unit side to the connecting unit 50 at the vehicle body side. Reversely, the pair of right and left attachment connecting pins 62 are removed from the support members 51 and the upper connecting members 42, and the pair of right and left fixing connecting pins 61 are disengaged from the support members 51, thereby releasing connection between the connecting unit 40 at the grass collecting unit side and the connecting unit 50 at the vehicle body side.

Positioning guide elements 54 are provided in the pair of right and left support member 51 at lower portions of the upper pin receiving openings 53. The positioning guide elements 54 supportingly receive the upper connecting members 42 thereby aligning the pin holes 43 formed in the upper connecting members 42 with the upper pin receiving openings 53 formed in the support members 51.

As shown in FIG. 4, the stand unit 70 includes a front stand body 71 supported to the underside of the container body 32a of the grass container 32 at a front end thereof, and a rear stand body 72 supported to the underside of the container supporting member 33c. As shown in FIGS. 1 and 4, the front stand body 71 and the rear stand body 72 are pivotably supported through connecting shafts 73 attached to proximal end portions thereof. The stand unit 70 is vertically pivoted about axes of the connecting shafts 73 to switch between a stored position in which the stand unit extends along the bottom surface of the grass container 32 or the container supporting member 33c and a use position in which the stand unit extends downwardly of the grass container 32 or the container supporting member 33c. When the stand unit is lowered to switch to the use position, the front stand body 71 and the rear stand body 72 are fixed in the lowered use position as lock pins 74 are attached to proximal portions of the front stand body 71 and the rear stand body 72, and a connecting rod 75 is attached to the front stand body 71 and the rear stand body 72 for interconnecting intermediate portions thereof. As shown in FIG. 4, when the front stand body 71 and the rear stand body 72 are pivoted and lowered to the use position, the stand unit 70 supports the grass container 32 to the ground at a ground level where the support frame assembly 31 is attachable to or detachable from the chassis 4. When the front stand body 71 and the rear stand body 72 are raised to switch to the stored position, the stand unit 70 allows the grass container 32 to be lowered to the grass collecting position by the lift cylinders 34.

Figure 5:
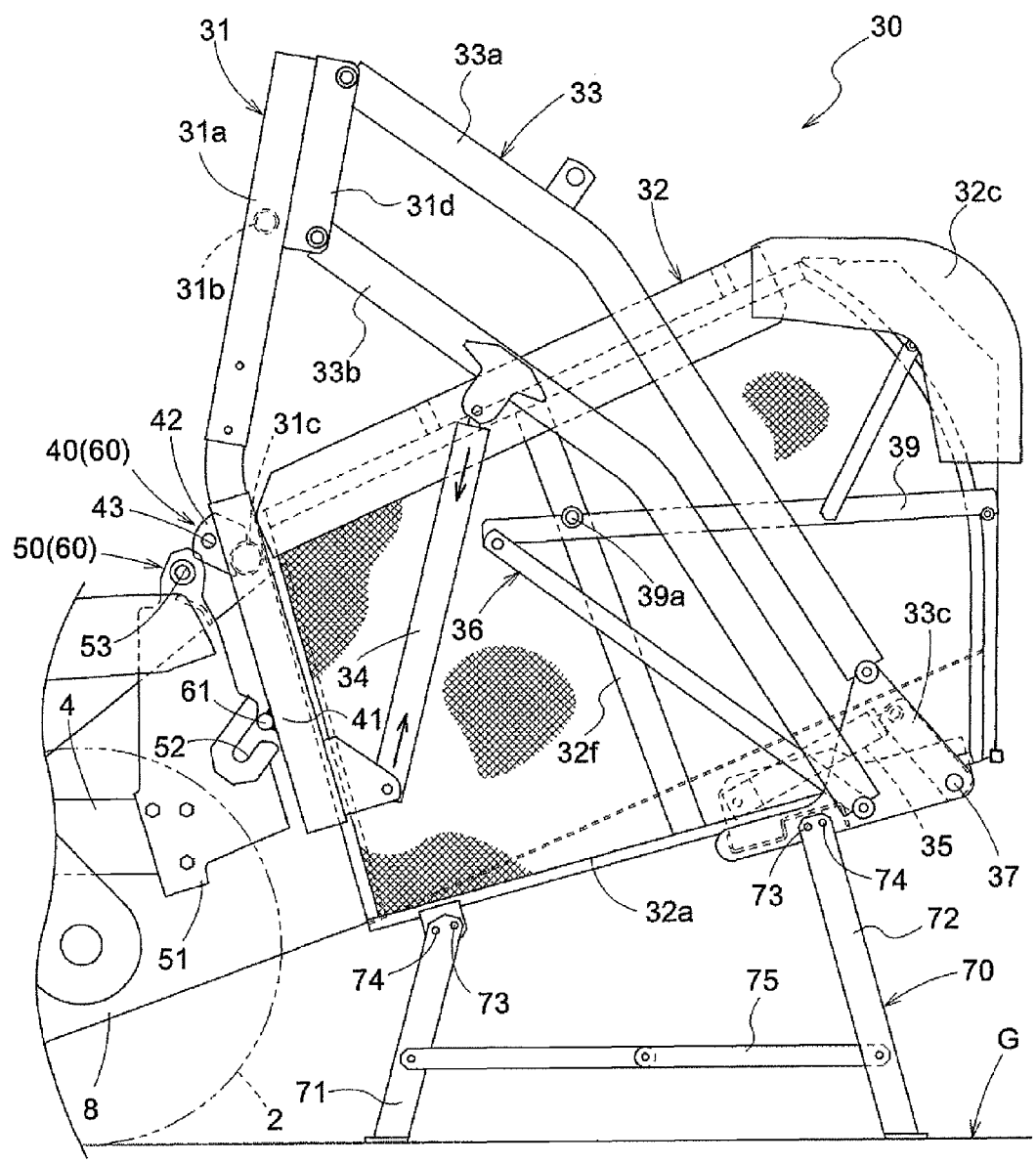
FIG. 5 is another side view of the grass collecting unit showing how it is attached to or detached from the vehicle body.
Figure 6:
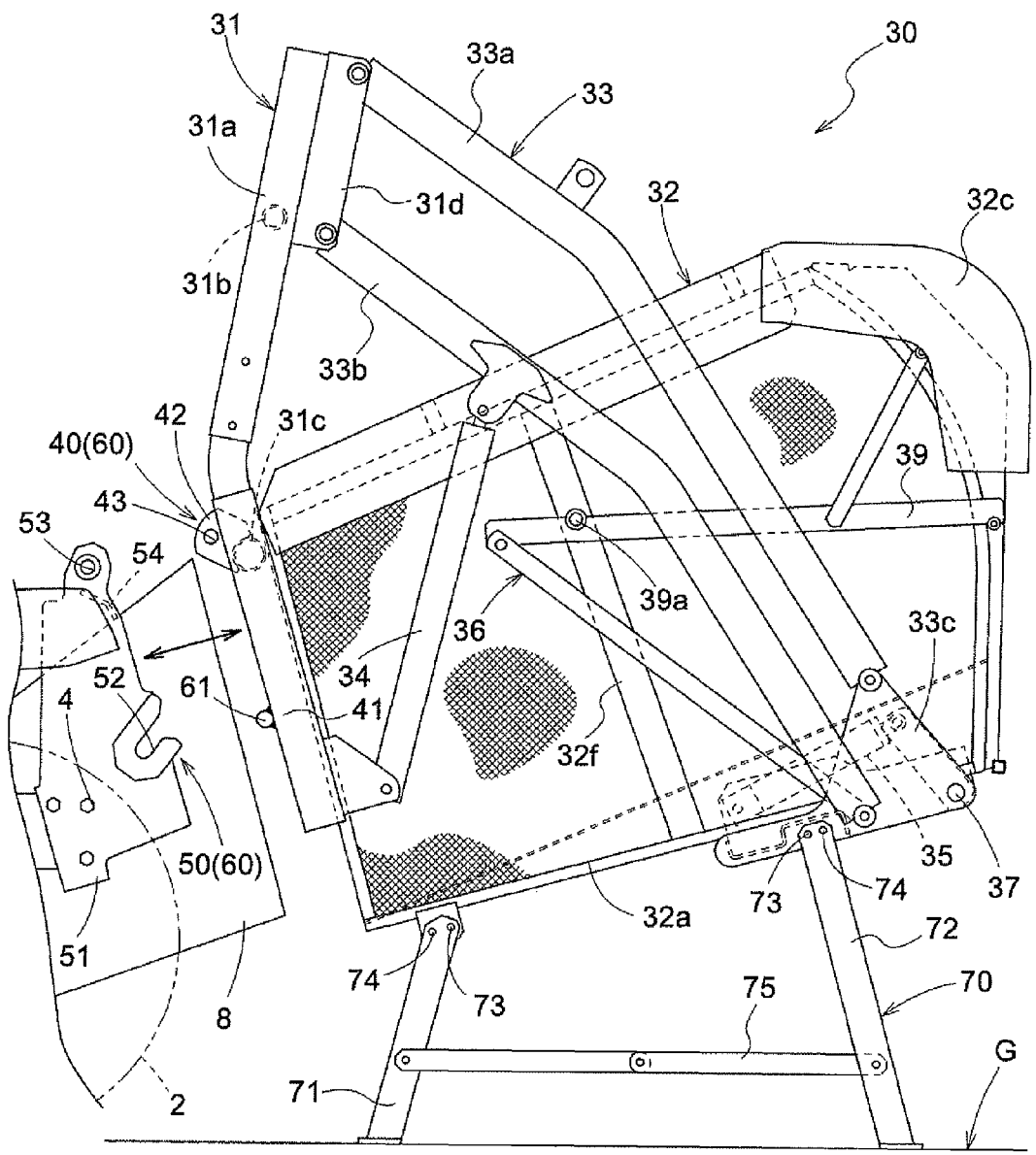
FIG. 6 is a further side view of the grass collecting unit showing how it is attached to or detached from the vehicle body.

FIGS. 4, 5, and 6 are side views of the grass collecting unit 30 showing how it is attached or detached. As shown in the drawings, in order to remove the grass collecting unit 30, the stand unit 70 is switched to the lowered use position, and the pair of right and left lift cylinders 34 are contracted to lower the grass container 32. When the front stand body 71 and the rear stand body 72 contact the ground G to allow the grass container 32 to be supported to the ground G through the stand unit 70, the pair of right and left attachment connecting pins 62 are removed to contract the pair of right and left lift cylinders 34. Each lift cylinder 34 allows the support frame unit 31 and the link mechanism 33 to be pivoted relative to each other to narrow a distance between the lower end portion of the support frame unit 31 and a distal end portion of the lower lift link 33b, thereby allowing the lower end portion of the support frame unit 31 to be moved rearwardly and upwardly of the grass container 32. As a result, the connecting unit 40 at the grass collecting unit side is moved rearwardly and upwardly away from the connecting unit 50 at the vehicle body side, and the pair of right and left fixing connecting pins 61 are removed from the lower pin receiving openings 52 provided in the support members 51 to release connection established by the connecting mechanism 60 between the connecting unit 40 at the grass collecting unit side and the connecting unit 50 at the vehicle body side, which eventually allows the grass collecting unit 30 to be removed from the lawn mower.

In order to attach the grass connecting unit 30, the lawn mower is forced to travel backward to bring the connecting unit 50 at the vehicle body side closer to the connecting unit 40 at the grass collecting unit side 30 that is now supported to the ground G through the stand unit 70. As a distance between the connecting unit 50 at the vehicle body side and the connecting unit 40 at the grass collecting unit side becomes proper, the pair of right and left lift cylinder 34 are extended. Each lift cylinder 34 allows the support frame unit 31 and the link mechanism 33 to be pivoted relative to each other to widen a distance between the lower end portion of the support frame unit 31 and a distal end portion of the lower lift link 33b, thereby allowing the lower end portion of the support frame unit 31 to be moved forwardly and downwardly of the grass container 32. As a result, the connecting unit 40 at the grass collecting unit side is moved closer to the connecting unit 50 at the vehicle body side from the rear side and the upper side, and the pair of right and left fixing connecting pins 61 are engaged with the lower pin receiving openings 52 provided in the support members 51 while the pin holes 43 formed in the pair of right and left upper connecting members 42 are aligned with the upper pin receiving openings 53 provided in the support members 51. The pair of right and left attachment connecting pins 62 are attached to establish connection by the connecting mechanism 60 between the connecting unit 40 at the grass collecting unit side and the connecting unit 50 at the vehicle body side, which eventually allows the grass collecting unit 30 to be connected to the lawn mower. Then, the pair of right and left lift cylinders 34 are extended to raise the grass container 32, allowing the stand unit 70 to be lifted from the ground G, thereby switching the stand unit 70 to the raised stored position.

The pair of right and left attachment connecting pins 62 each receives a retainer pin 62 at an end portion thereof to be retained against the support members 51 and the upper connecting members 42.

Modified Embodiments (1) An electrically driven actuator may be employed to raise or lower the grass container 32, instead of the lift cylinder 34 noted above. The lift cylinder 34 and the electrically driven actuator are generally referred to as a driving unit.

(2) The object of the present invention may also be achieved when any rest member acting as the support is disposed between the ground and the grass container 32 to support the grass container 32 to the ground, instead of the stand unit 70 noted above. Thus, any kind of rest members including the above-noted stand unit 70 are generally referred to as a support 70.

What is claimed is:

1. A lawn mower with a chassis and a grass collecting unit, the grass collecting unit comprising:
    a support frame assembly detachably connected to a rear portion of the chassis;
    a vertically movable grass container supported by the support frame assembly;
    a support base supporting the grass container on the ground; and
    a connecting mechanism detachably connecting the support frame assembly to the chassis, the connecting mechanism including a grass collecting unit side connecting unit provided in the support frame assembly, and a vehicle body side connecting unit provided in the chassis;
    wherein the support frame assembly includes a vertical frame detachably connected to the rear portion of the chassis and a link mechanism extending obliquely downward from an upper portion of the vertical frame, the grass container being supported by the vertical frame through the link mechanism, a hydraulic cylinder extending between a lower portion of the vertical frame and the link mechanism, and the grass container is raised rearward and upward away from the chassis via the link mechanism in association with an extending operation of the hydraulic cylinder; and
    wherein the grass collecting unit side connecting unit is provided at the lower portion of the vertical frame, and the lower portion of the vertical frame is displaced toward a lower portion of the link mechanism and the grass collecting unit side connecting unit is disconnected from the vehicle body side connecting unit by raising the vertical frame in association with a contracting operation of the hydraulic cylinder while the grass container is supported on the ground by the support base.

2. The lawn mower claimed in claim 1, wherein the support base is attached to the grass container to change its position and selectively switchable between a use position in which the support base contacts the ground at one end thereof to support the grass container and a stored position in which the entire support base is pulled up to the grass container to be supportingly received by the grass container.

3. The lawn mower claimed in claim 1, wherein:
    the grass collecting unit side connecting unit includes a fixing connecting pin provided at the lower portion of the vertical frame and a pin hole defined at the upper portion of the vertical frame;
    the vehicle body unit side connecting unit includes a first pin receiving opening with which the fixing connecting pin is detachably engaged, and a second pin receiving opening operatively aligned with the pin hole of the grass collecting unit side connecting unit; and
    the connecting mechanism is adapted to connect the grass collecting unit to the chassis by a connecting function achieved by the fixing connecting pin in the grass collecting unit side connecting unit that is received in the first pin receiving opening in the vehicle body side connecting unit, and a connecting function achieved by an attachment connecting pin that is inserted into the pin hole in the grass collecting unit side connecting unit and the second pin receiving opening in the vehicle body side connecting unit.

4. The lawn mower claimed in claim 3, wherein a guide element is provided for aligning the pin hole in the grass collecting unit side connecting unit with the second pin receiving opening in the vehicle body side connecting unit.

5. The lawn mower claimed in claim 3, wherein the fixing connecting pin in the grass collecting unit side connecting unit and the first pin receiving opening in the vehicle body side connecting unit cooperatively achieve a guiding function in a process for attachment and detachment between the grass collecting unit and the chassis.

6. The lawn mower claimed in claim 2, wherein the support base comprises a foldable stand, and wherein the stand is folded to extend along a bottom of the grass container in the stored position, and unfolded to extend downward from the bottom of the grass container into contact with the ground in the use position.

7. A lawn mower with a chassis and a grass collecting unit, the grass collecting unit comprising:
    a support frame assembly detachably connected to a rear portion of the chassis;
    a vertically movable grass container supported by the support frame assembly;
    a support base supporting the grass container on the ground, the support base including a front stand attached to a forward and lower portion of the grass collecting unit and a rear stand attached to a rearward and lower portion of the grass collecting unit; and
    a connecting mechanism detachably connecting the grass collecting unit to the chassis, the connecting mechanism including a grass collecting unit side connecting unit provided in the support frame assembly, and a vehicle body side connecting unit provided in the chassis;
    wherein the support frame assembly includes a vertical frame detachably connected to the rear portion of the chassis and a link mechanism extending obliquely downward from an upper portion of the vertical frame, the grass container being supported by the vertical frame through the link mechanism, a hydraulic cylinder extending between a lower portion of the vertical frame and the link mechanism, and the grass container is raised rearward and upward away from the chassis via the link mechanism in association with an extending operation of the hydraulic cylinder; and
    wherein the lower portion of the vertical frame is displaced toward a lower portion of the link mechanism and the grass collecting unit side connecting unit is detached from the vehicle body side connecting unit by raising the support frame assembly in association with a contracting operation of the hydraulic cylinder while the grass collecting unit is set in the use position supported on the ground by the front stand and the rear stand, whereby the grass collecting unit side connecting unit is disconnected from the vehicle body side connecting unit.

8. A lawn mower with a chassis and a grass collecting unit, the grass collecting unit comprising:
- a support frame assembly detachably connected to a rear portion of the chassis;
- a vertically movable grass container supported by the support frame assembly;
- a hydraulic cylinder for vertically moving the grass container relative to the support frame assembly;
- a support base supporting the grass container on the ground; and
- a connecting mechanism detachably connecting the grass collecting unit to the chassis, the connecting mechanism including a grass collecting unit side connecting unit provided in the support frame assembly, and a vehicle body side connecting unit provided in the chassis;
- wherein the vehicle body side connecting unit includes a first pin receiving hole extending in a lateral direction thereof and a cutout profile defined downward of the first pin receiving hole, the cutout profile being in form of a U-letter as viewed from a lateral side of the mower and being opened rearward and upward with legs of the U-letter inclined rearward and upward, and;
- wherein the grass collecting unit side connecting unit includes a second pin receiving hole extending in a lateral direction thereof and a fixing connecting pin defined downward of the second pin receiving hole and detachably engaged with the cutout profile; and
- wherein the grass collecting unit is attached to the chassis by lowering the support frame assembly in association with an operation of the hydraulic cylinder while the grass collecting unit is supported on the ground via the support base, and by guiding the fixing connecting pin along the inclined legs of the U-letter of the cutout profile and interconnecting the first pin receiving hole and the second pin receiving hole via an attachment connecting pin.

9. The lawn mower claimed in claim 8, further comprising:
a positioning guide element provided downward of the first pin receiving hole, the positioning guide element supports the support frame assembly so that the first pin receiving hole is aligned with the second pin receiving hole.

10. The lawn mower claimed in claim 8, wherein:
- the support frame assembly includes a vertical frame detachably connected to the rear portion of the chassis and a link mechanism extending obliquely downward from an upper portion of the vertical frame, the grass container being supported by the vertical frame through the link mechanism, the hydraulic cylinder extending between a lower portion of the vertical frame and the link mechanism;
- the vehicle body side connecting unit includes a pair of right/left vertically elongated support members, the first pin receiving hole extending at an upper portion thereof and the cutout profile being defined at a lower portion thereof; and
- the vertical frame of the grass collecting unit side connecting unit has the second pin receiving hole extending at an upper portion thereof and the fixing connecting pin defined at a lower portion thereof.

* * * * *